United States Patent
Huang et al.

(10) Patent No.: US 10,234,080 B2
(45) Date of Patent: Mar. 19, 2019

(54) SURFACE LIGHT SOURCE DEVICE, EDGE-LIT TYPE BACKLIGHT MODULE AND DISPLAY DEVICE

(71) Applicant: KAISTAR Lighting (Xiamen) Co., Ltd., Xiamen (CN)

(72) Inventors: Wei Huang, Xiamen (CN); Ming Cheng Hua, Xiamen (CN)

(73) Assignee: KAISTAR LIGHTING (XIAMEN) CO., LTD., Xiamen (CN)

( * ) Notice: Subject to any disclaimer, the term of this patent is extended or adjusted under 35 U.S.C. 154(b) by 0 days.

(21) Appl. No.: 15/810,017

(22) Filed: Nov. 11, 2017

(65) Prior Publication Data

US 2018/0274736 A1 Sep. 27, 2018

(30) Foreign Application Priority Data

Mar. 27, 2017 (CN) .......................... 2017 1 0187820

(51) Int. Cl.
*F21K 9/61* (2016.01)
*F21K 9/68* (2016.01)
*F21V 8/00* (2006.01)

(52) U.S. Cl.
CPC .................. *F21K 9/61* (2016.08); *F21K 9/68* (2016.08); *G02B 6/0028* (2013.01); *G02B 6/003* (2013.01)

(58) Field of Classification Search
CPC .... G02B 6/0028; G02B 6/003; G02B 6/0023; G02B 6/0043; G02B 6/0055
USPC ....................................................... 362/610
See application file for complete search history.

(56) References Cited

U.S. PATENT DOCUMENTS

| 5,786,665 | A  | * | 7/1998 | Ohtsuki | G02B 6/0021 313/113 |
|---|---|---|---|---|---|
| 7,484,873 | B2 | * | 2/2009 | Dejima | G02B 6/002 362/606 |
| 2007/0081360 | A1 | * | 4/2007 | Bailey | G02B 6/0021 362/621 |
| 2007/0086184 | A1 | * | 4/2007 | Pugh | G02B 6/0023 362/231 |
| 2013/0271700 | A1 | * | 10/2013 | Nakamura | G02B 6/0026 349/65 |
| 2014/0240644 | A1 | * | 8/2014 | Abe | G02B 6/0088 349/71 |
| 2015/0219821 | A1 | * | 8/2015 | Seo | G02B 6/0088 362/608 |

(Continued)

FOREIGN PATENT DOCUMENTS

| CN | 2731497 Y | 10/2005 |
|---|---|---|
| CN | 203500892 U | 3/2014 |

(Continued)

*Primary Examiner* — William N Harris
(74) *Attorney, Agent, or Firm* — Hemisphere Law, PLLC; Zhigang Ma

(57) ABSTRACT

A surface light source device is additionally disposed with a light guide bar between a light-emitting source and a light guide film to collect rays emitted from the light-emitting source and transmit the rays to a light incident surface of the light guide film. A thickness of the light guide bar is designed to be gradually tapered to achieve the objective of reduction in the thickness of a conventional light guide plate. Moreover, the surface light source device can be applied in an edge-lit type backlight module and a display device, as well as in the illumination field.

19 Claims, 2 Drawing Sheets

(56) References Cited

U.S. PATENT DOCUMENTS

2017/0090111 A1* 3/2017 Teragawa ............. G02B 6/0055

FOREIGN PATENT DOCUMENTS

| CN | 106104149 A | 11/2016 |
| DE | 202013008911 U1 | 11/2014 |
| TW | 201033649 A | 9/2010 |
| TW | 201445197 A | 12/2014 |
| TW | 201516533 A | 5/2015 |
| TW | 201642001 A | 12/2016 |

* cited by examiner

SURFACE LIGHT SOURCE DEVICE, EDGE-LIT TYPE BACKLIGHT MODULE AND DISPLAY DEVICE

FIELD OF THE DISCLOSURE

The disclosure relates to a display technical field, and more particularly to a surface light source device and the application thereof.

BACKGROUND

The fundamental structure of a conventional edge-lit type backlight module includes one piece of light guide plate. The volume and weight of the light guide plate each occupy a ratio of almost 50% of the entire device. The reduction of the volume and weight of the light guide plate can reduce costs of the backlight module. However, with respect to an edge-lit type backlight module, the decrement of the volume of the light guide plate means rays may be leaked out.

SUMMARY

Therefore, the disclosure provides a surface light source device and the application thereof, which can achieve the objective of reducing the thickness of the light guide plate and preventing light leakage simultaneously.

Specifically, a surface light source device provided by an embodiment of the disclosure includes a light-emitting source, a light guide film and a light guide bar. The light guide film has a light incident surface and a second surface adjacent to the light incident surface. The light guide bar is configured (i.e., structured and arranged) for collecting rays emitted from the light-emitting source and transmitting the rays to the light incident surface of the light guide film. The light guide film is configured for converting the rays to be a surface light source and outputting the surface light source from the second surface; the light guide bar has a first end and an opposite second end. The light-emitting source is disposed on the first end. The light guide film is disposed on the second end. The light incident surface of the light guide film faces toward the light guide bar. A thickness of the second end gradually decreases along a direction approaching the light guide film, i.e., the second end is gradually tapered in the direction approaching the light guide film.

In an embodiment of the disclosure, the first end is defined with a first groove. The light-emitting source is inserted in the first groove, and the light-emitting source is a LED light bar.

In an embodiment of the disclosure, the second end is defined with a second groove. An end of the light guide film with the light incident surface is fixed in the second groove.

In an embodiment of the disclosure, the first end is defined with a first groove, and a bottom of the first groove is disposed with a first convex lens structure. The second end is defined with a second groove, and a bottom of the second groove is disposed with a second convex lens structure. A convex surface of the first convex lens structure faces toward the light-emitting source. A convex surface of the second convex lens structure faces toward the light incident surface of the light guide film.

In an embodiment of the disclosure, a thickness of the first end gradually decreases along a direction departing from the light guide film. The light guide bar further includes an intermediate section interconnected between the first end and the second end, and the intermediate section approximately is rectangular.

In an embodiment of the disclosure, the light guide film has a third surface opposite to the second surface and adjacent to (i.e., neighboring with) the light incident surface. A side surface of the first end located at a side of the second surface of the light guide film is a curved surface, and a side surface of the first end located at a side of the third surface of the light guide film is a planar surface.

In an embodiment of the disclosure, the light-emitting source is located in a focal plane of the first convex lens structure. The light incident surface is located in a focal plane of the second convex lens structure.

In an embodiment of the disclosure, a portion of the second surface of the light guide film adjacent to the light incident surface is disposed with a reflective material layer and a portion of the second surface far away from the light incident surface is not being disposed with any reflective material layer to make the second surface locally emit light.

Furthermore, an edge-lit type backlight module provided by an embodiment of the disclosure includes an optical film set and any one of the above surface light source devices; the second surface of the light guide film of the surface light source device faces toward the optical film set; the light guide film of the surface light source device has a third surface opposite to the second surface and adjacent to the light incident surface, and the third surface is disposed with a plurality of dots.

Moreover, a display device provided by an embodiment of the disclosure includes a non-luminous display panel and any edge-lit type backlight module described above; the non-luminous display panel is located at a side of the optical film set far away from the light guide film.

It can be known from the above that embodiments of the disclosure additionally disposes the light guide bar between the light-emitting source and the light guide film to collect rays emitted from the light-emitting source and transmit the rays to the light incident surface of the light guide film, along with the design of gradual decrement of the thickness of the light guide bar, which can make the light guide film to be thinner, so as to achieve the objective of reducing the thickness of the conventional light guide plate.

By the following detailed description with reference to accompanying drawings, other aspects and features of the disclosure will become apparent. However, it should be understood that, the drawings only are for the purpose of explanation and not as limiting the scope of the disclosure, and the scope of the disclosure should refer to the appended claims. It also be appreciated that, unless otherwise indicated, the drawings are not necessarily drawn to scale, they are merely trying to conceptually illustrate the structures and procedures described herein.

BRIEF DESCRIPTION OF THE DRAWINGS

In the following, with reference to accompanying drawings, concrete embodiments of the disclosure will be described in detail.

DETAILED DESCRIPTION OF PREFERRED EMBODIMENTS

Embodiments of the disclosure are described in detail with reference to the accompanying drawings as follows to better understand the objectives, features and advantages of the disclosure.

Figure 1:
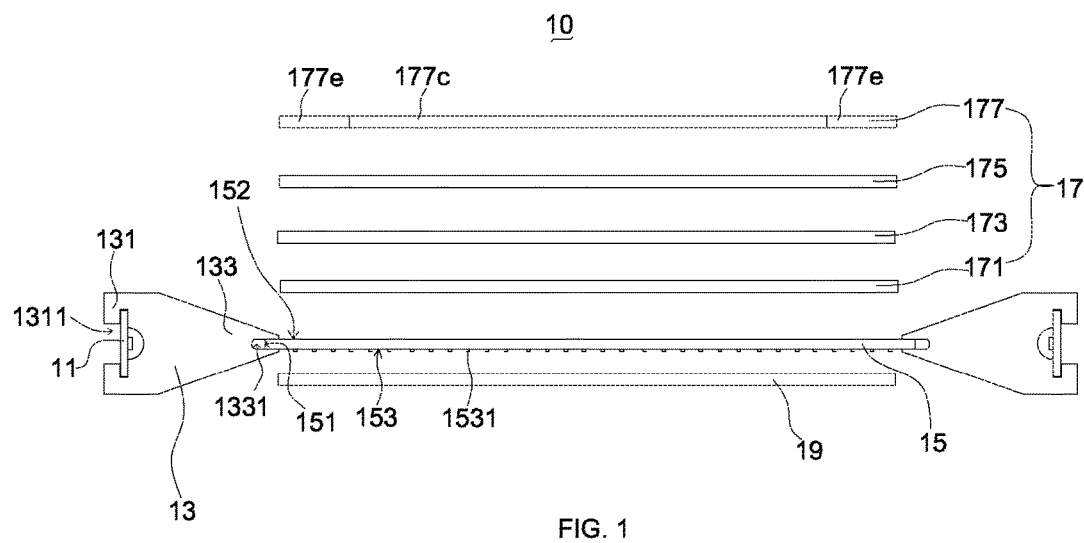
FIG. 1 is a structural schematic view of an edge-lit type backlight module according to a first embodiment of the disclosure.

Referring to FIG. 1, an edge-lit type backlight module 10 provided by a first embodiment of the disclosure includes a light-emitting source 11, a light guide bar 13, a light guide film 15, an optical film set 17 and a reflective sheet 19. The light-emitting source 11, the light guide bar 13 and the light guide film 15 together form a surface light source device. The light guide bar 13 and the light guide film 15 are separate parts and capable of being mounted/assembled together.

The light-emitting source 11 is for example a LED light bar, which includes a strip-shaped PCB and multiple LED lamps disposed on the PCB. Of course, the light-emitting source 11 can likewise include the strip-shaped PCB and multiple other point light sources disposed on the PCB, or the light-emitting source 11 is other linear light.

The light guide bar 13 has a first end 131 and an opposite second end 133. The first end 131 is defined/formed with a groove 311. The light-emitting source 11 is inserted in the groove 311. The second end 133 and the first end 131 are connected, and a thickness of the second end 133 gradually decreases in a direction approaching the light guide film 15, and the direction is a horizontally rightward direction in FIG. 1. In other words, the second end 133 is gradually tapered in the horizontally rightward direction in FIG. 1. The second end 133 is a tapered structure. The second end 133 is defined with a groove 1331. A side of the light guide film 15 with the light incident surface 151 is fixed in the groove 1331 and the light incident surface 151 is located in the groove 1331. The number of the light guide bars 13 can be two as shown in FIG. 1. The light guide film 15 is correspondingly located between the two light guide bars 13 and two opposite sides of the light guide film 15 are respectively inserted in the grooves 1331 of the second ends 133 of the two light guide bars 13 with fixation; it should be understood that, the number of the light guide bar can also be one, or even more than two.

The light guide film 15 has the light incident surface 151, a second surface 152 adjacent to the light incident surface 151, and a third surface 153 opposite to the second surface 152 and adjacent to the light incident surface 151. The light incident surface 151 faces toward the light guide bar 13. The second surface 152 faces toward the optical film set 17 as a light-emitting surface. The third surface 153 is preferably disposed with multiple dots 1531. The dots 1531 can be formed on the third surface 153 by a manner such as etching, printing, attaching reflective points, etc. to allow the rays to be reflected to the second surface 152 of the light guide film 15 for emission by the dots 1531, which can achieve the objective of enhancing uniformity of illumination.

The optical film set 17 is located at a side of the light guide film 15 adjacent to the second surface 152, which for example includes a diffuser (diffusing sheet) 171, light enhancement sheets 173, 175 and a light shading sheet 177 sequentially stacked on the second surface 152 of the light guide plate 15 in that order. The light shading sheet 177 includes a central transparent section 177c and a marginal light-shading section 177e.

The reflective sheet 19 is located at a side of the light guide film 15 adjacent to the third surface 153, which can be a metallic sheet or other reflective material layer.

The first embodiment of the disclosure additionally disposes the light guide bar 13 between the light-emitting sources 11 and the light guide film 15 to collect rays emitted from the light-emitting source 11 and transmit the rays to the light incident surface 151 of the light guide film 15. The light guide film 15 is configured for converting the rays to be a surface light source and outputting the surface light source from the second surface 152. The thickness of the light guide film 15 can be reduced to be 1 mm (millimeter) or thinner, even as thin as 0.1-0.2 mm, which can prevent the light leakage and significantly decrease the volume and weight of the light guide plate in the conventional liquid crystal display device simultaneously, as well as reducing the cost.

Figure 2A:
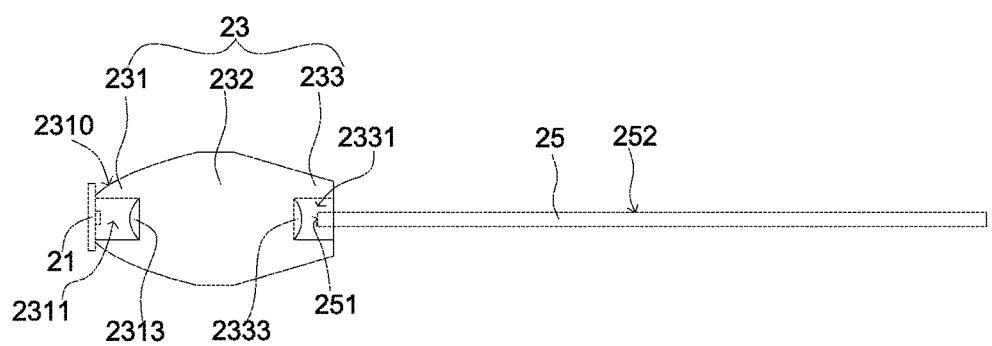
FIG. 2A is a structural schematic view of a surface light source device according to a second embodiment of the disclosure.
Figure 2B:
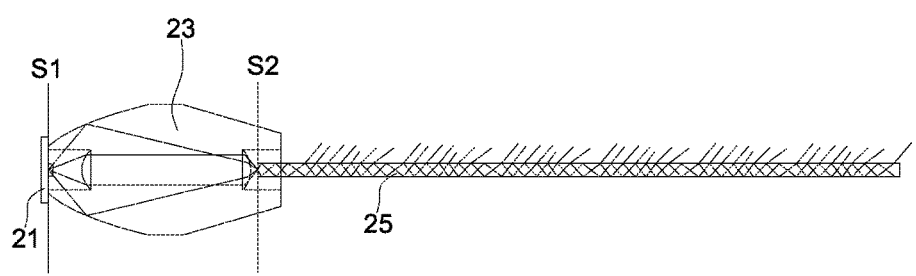
FIG. 2B is a schematic view of an optical path of the surface light source device according to the second embodiment of the disclosure.

Referring to FIG. 2A and FIG. 2B, the surface light source device provided by a second embodiment of the disclosure includes a light-emitting source 21, a light guide bar 23 and a light guide film 25. The light guide bar 23 and the light guide film 25 are separate parts and capable of being mounted/assembled together.

The light-emitting source 21 is for example a LED light bar, which includes a strip-shaped (i.e., generally elongated) PCB and one or more LED lamps disposed on the PCB. Of course, the light-emitting source 21 can also include the strip-shaped PCB and one or more other point light sources disposed on the PCB, or the light-emitting source 21 is other linear light.

The light guide bar 23 has a first end 231, an opposite second end 233 and an intermediate section 232 interconnected between the first end 231 and the second end 233. A thickness of the first end 231 gradually decreases in a direction departing from the light guide film 25, and the direction is a horizontally leftward direction in FIG. 2A. In other words, the first end 231 is gradually tapered in the horizontally leftward direction in FIG. 2A. Side surfaces 2310 located at two sides of the light guide film 25 are preferably curved surfaces to achieve a relatively good light convergence effect, which can be planar surfaces instead. Moreover, the first end 231 is defined with a groove 2311, and the bottom of the groove 2311 is disposed with a convex lens structure 2313. A convex surface of the convex lens structure 2313 faces toward the light-emitting source 21. A thickness of the second end 233 gradually decreases in a direction approaching the light guide film 25, and the direction is a horizontally rightward direction in FIG. 2A. In other words, the second end 233 is gradually tapered in the horizontally rightward direction in FIG. 2A. The second end 233 is defined with a groove 2331, and the bottom of the groove 2331 is disposed with a convex lens structure 2333. A convex surface of the convex lens structure 2333 faces toward the light incident surface 251 of the light guide film 25. As the first end 231 and the second end 233 of the light guide bar 23 both have the reducing thickness structure, the intermediate section 232 is designed to be approximately rectangular for convenience of mounting/securing the light guide bar 23.

The second surface 252 adjacent to the light incident surface 251 of the light guide film 25 is used as a light-emitting surface to provide the surface light source.

FIG. 2B is a schematic view of an optical path of the surface light source device according to the second embodiment. It can be known from FIG. 2A and FIG. 2B that the light guide bar 23 converges rays emitted from the light-emitting source 21 and passing through the side surfaces 2310 and the convex lens structure 2313 of the first end 231 of the light guide bar 23, and further concentrates the converged rays to be irradiated to the light incident surface 251 of the light guide film 25 by the convex lens structure 2333 of the second end 233, which can prevent the light leakage and significantly decrease the thickness of the light guide film 25. Preferably, in order to further enhance the optical coupling efficiency of the light guide bar 23 and the light guide film 25, the light-emitting source 21 is disposed in a focal plane S1 of the convex lens structure 2313 and the light incident surface 251 of the light guide film 25 is disposed in a focal plane S2 of the convex lens structure 2333, which can be referred to FIG. 2B.

Figure 3:
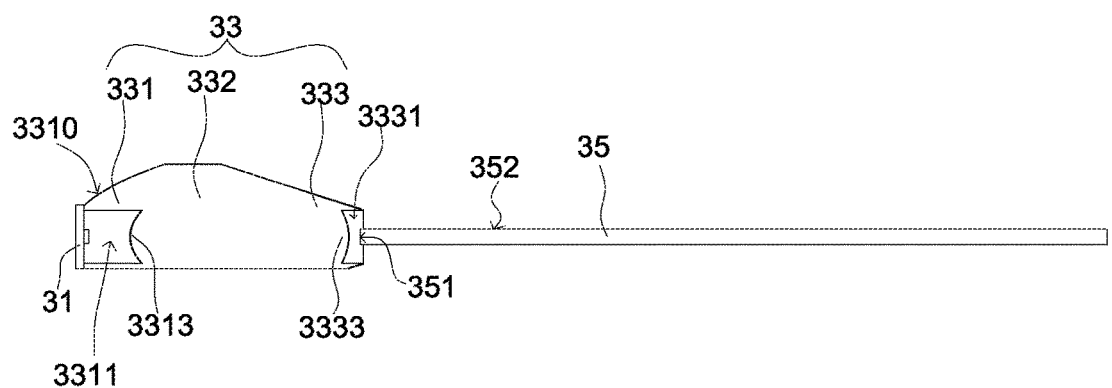
FIG. 3 is a structural schematic view of a surface light source device according to a third embodiment of the disclosure.

Referring to FIG. 3, the surface light source device provided by a third embodiment of the disclosure includes a light-emitting source 31, a light guide bar 33 and a light guide film 35. The light guide bar 33 and the light guide film 35 are separate parts and capable of being mounted/assembled together.

The light-emitting source 31 is for example a LED light bar, which includes a strip-shaped PCB and one or more LED lamps disposed on the PCB. Of course, the light-emitting source 31 can also include the strip-shaped PCB and one or more other point light sources disposed on the PCB, or the light-emitting source 31 is other linear light.

The light guide bar 33 has a first end 331, an opposite second end 333 and an intermediate section 332 interconnected between the first end 331 and the second end 333. A thickness of the first end 331 gradually decreases in a direction departing from the light guide film 35, and the direction is a horizontally leftward direction in FIG. 3. In other words, the first end 331 is gradually tapered in the horizontally leftward direction in FIG. 3. A side surface 3310 located at the side of the second surface 352 of the light guide film 35 preferably is a curved surface to achieve a relatively good light convergence effect, which can be a planar surface instead; a side surface (i.e. the bottom surface of the light guide bar 33 in FIG. 3) of the first end 331 located at the opposite side of the second surface 352 of the light guide film 35 is a planar surface, which can also be a curved surface instead, as long as the entire thickness of the first end 331 is gradually decreased. Moreover, the first end 331 is defined with a groove 3311, and the bottom of the groove 3311 is disposed with a convex lens structure 3313. A convex surface of the convex lens structure 3313 faces toward the light-emitting source 31. A thickness of the second end 333 gradually decreases in a direction approaching the light guide film 35, and the direction is a horizontally rightward direction in FIG. 3. In other words, the second end 333 is gradually tapered in the horizontally rightward direction in FIG. 3. The second end 333 is defined with a groove 3331, and the bottom of the groove 3331 is disposed with a convex lens structure 3333. A convex surface of the convex lens structure 3333 faces toward the light incident surface 351 of the light guide film 35. As the first end 331 and the second end 333 of the light guide bar 33 both have the reducing thickness structure, the intermediate section 332 is designed to be approximately rectangular for convenience of mounting/securing the light guide bar 33. The side surface of the first end 331 of the light guide bar 33 located at the opposite side of the second surface 352 of the light guide film 35 is likewise a planar surface, which is benefit for mounting and fixing the light guide bar 33.

The second surface 352 adjacent to the light incident surface 351 of the light guide film 35 is used as a light-emitting surface to provide the surface light source.

Figure 4:
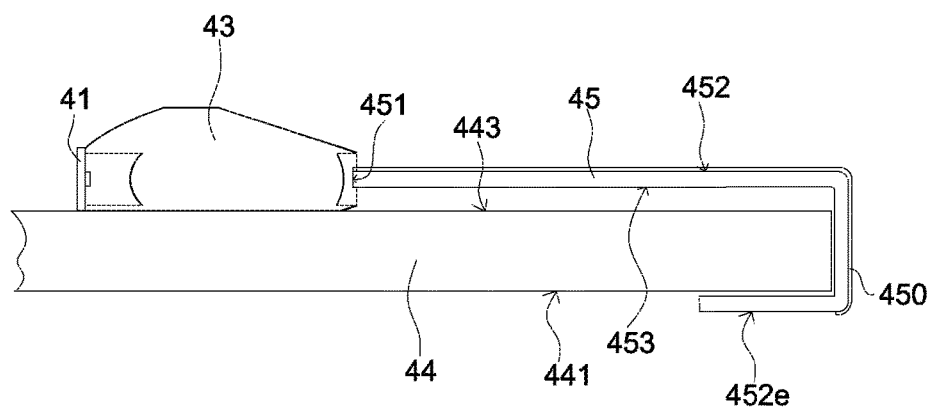
FIG. 4 is a schematic view of application of a surface light source device according to a fourth embodiment of the disclosure.

Referring to FIG. 4, FIG. 4 is a schematic view of application of a surface light source device according to a fourth embodiment of the disclosure. As shown in FIG. 4, structures of a light-emitting source 41 and a light guide bar 43 in the surface light source device of the fourth embodiment are identical to the structures of the light-emitting source 31 and the light guide bar 33 shown in FIG. 3, which will not be repeated. Moreover, the light-emitting source 41 and the light guide bar 43 of the embodiment are disposed on a back side 443 of a base 44. The light guide film 45 in the surface light source device is disposed on a second end of the light guide bar 43 and the light guide film 45 is a flexible film being bendable.

A light incident surface 451 of the light guide film 45 faces toward the light guide bar 43. A portion of the second surface 452 adjacent to the light incident surface 451 is disposed with a reflective material layer 450, and the portion also is a portion of the second surface 452 located at the back side 443 and the lateral side of the base 44. Another portion 452e of the second surface 452 far away from the light incident surface 451 is not disposed with any reflective material layer, and the portion also is the portion 452e of the second surface 452 located at a front side 441 of the base 44. Accordingly, the second surface 452 locally emits light. For instance, the surface light source device formed by the light-emitting source 41, the light guide bar 43 and the light guide film 45 in the embodiment is for example utilized as the mirror-front light, and the base 44 is a mirror correspondingly. Moreover, the surface 453 of the light guide film 45 opposite to the second surface 452 and adjacent to the light incident surface 451 can also be disposed with the reflective material layer on the entire surface.

Figure 5:
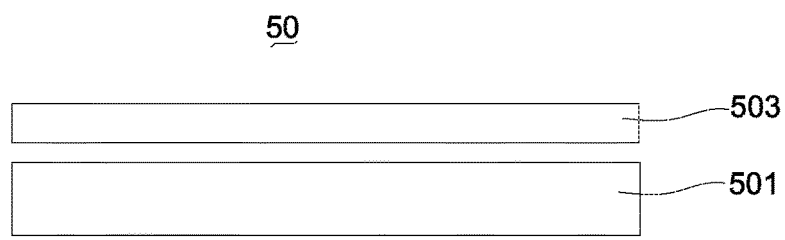
FIG. 5 is a structural schematic view of a display device according to a fifth embodiment of the disclosure.

Referring to FIG. 5, a display device 50 provided by a fifth embodiment of the disclosure includes an edge-lit type backlight module 501 and a non-luminous display panel 503. The edge-lit type backlight module 501 is configured (i.e., structured and arranged) to provide backlight illumination to the non-luminous display panel 503; the non-luminous display panel 503 is for example a liquid crystal panel. Moreover, the edge-lit type backlight module 501 of the embodiment can adopt the edge-lit type backlight module 10 as shown in FIG. 1, and the surface light source device can further be replaced by the surface light source device as shown in FIG. 2A or FIG. 3.

The above description illustrates preferred embodiments of the disclosure rather than any limitation, though the preferred embodiments are disclosed above, the disclosure needs not be limited to the disclosed embodiments. For those skilled persons in the art, various modifications and variations can be made according to the concept of the disclosure. It is intended to cover various modifications and similar arrangements included within the spirit and scope of the appended claims that are to be accorded with the broadest interpretation so as to encompass all such modifications and similar structures.

What is claimed is:

1. A surface light source device, comprising a light-emitting source; wherein the surface light source device further comprises a light guide film and a light guide bar; the light guide film has a light incident surface and a second surface adjacent to the light incident surface, the light guide bar is configured for collecting rays emitted from the light-emitting source and transmitting the rays to the light incident surface of the light guide film, the light guide film is configured for converting the rays to be a surface light source and outputting the surface light source from the second surface; the light guide bar has a first end and an opposite second end, the light-emitting source is disposed on the first end, the light guide film is disposed on the second end, the light incident surface of the light guide film faces toward the light guide bar, and a thickness of the second end gradually decreases along a direction approaching the light guide film;

wherein the first end is defined with a first groove and a bottom of the first groove is disposed with a first convex lens structure, the second end is defined with a second groove and a bottom of the second groove is disposed with a second convex lens structure, a convex surface of the first convex lens structure faces toward the light-emitting source, and a convex surface of the second convex lens structure faces toward the light incident surface of the light guide film.

2. The surface light source device according to claim 1, wherein the light-emitting source is inserted in the first groove, and the light-emitting source is a LED light bar.

3. The surface light source device according to claim 1, wherein an end of the light guide film with the light incident surface is fixed in the second groove.

4. The surface light source device according to claim 1, wherein a thickness of the first end gradually decreases along a direction departing from the light guide film, the light guide bar further comprises an intermediate section connected between the first end and the second end, and the intermediate section substantially is rectangular.

5. The surface light source device according to claim 4, wherein the light guide film has a third surface opposite to the second surface and adjacent to the light incident surface, a side surface of the first end located at a side of the second surface of the light guide film is a curved surface, and a side surface of the first end located at a side of the third surface of the light guide film is a planar surface.

6. The surface light source device according to claim 1, wherein the light-emitting source is located in a focal plane of the first convex lens structure, and the light incident surface is located in a focal plane of the second convex lens structure.

7. The surface light source device according to claim 1, wherein a portion of the second surface of the light guide film adjacent to the light incident surface is disposed with a reflective material layer and a portion of the second surface far away from the light incident surface is not disposed with the reflective material layer to make the second surface locally emit light.

8. An edge-lit type backlight module, comprising an optical film set and a surface light source device; the surface light source device comprising a light-emitting source, a light guide film and a light guide bar; the light guide film having a light incident surface and a second surface adjacent to the light incident surface, the light guide bar being configured for collecting rays emitted from the light-emitting source and transmitting the rays to the light incident surface of the light guide film, the light guide film being configured for converting the rays to be a surface light source and outputting the surface light source from the second surface; the light guide bar having a first end and an opposite second end, the light-emitting source being disposed on the first end, the light guide film being disposed on the second end, the light incident surface of the light guide film facing toward the light guide bar, the second end is gradually tapered in a direction approaching the light guide film; the second surface of the light guide film of the surface light source device facing toward the optical film set; the light guide film of the surface light source device having a third surface opposite to the second surface and adjacent to the light incident surface, and the third surface being disposed with a plurality of dots;

wherein the first end is defined with a first groove and a bottom of the first groove is disposed with a first convex lens structure, the second end is defined with a second groove and a bottom of the second groove is disposed with a second convex lens structure, a convex surface of the first convex lens structure faces toward the light-emitting source, and a convex surface of the second convex lens structure faces toward the light incident surface of the light guide film.

9. A display device, comprising a non-luminous display panel and an edge-lit type backlight module; the edge-lit type backlight module comprising an optical film set and a surface light source device, the surface light source device comprising a light-emitting source, further comprising a light guide film and a light guide bar; the light guide film having a light incident surface and a second surface adjacent to the light incident surface, the light guide bar being configured for collecting rays emitted from the light-emitting source and transmitting the rays to the light incident surface of the light guide film, the light guide film is configured for converting the rays to be a surface light source and outputting the surface light source from the second surface; the light guide bar having a first end and an opposite second end, the light-emitting source being disposed on the first end, the light guide film being disposed on the second end, the light incident surface of the light guide film facing toward the light guide bar, a thickness of the second end gradually decreasing along a direction approaching the light guide film; the second surface of the light guide film of the surface light source device facing toward the optical film set; the light guide film of the surface light source device having a third surface opposite to the second surface and adjacent to the light incident surface, and the third surface being disposed with a plurality of dots; the non-luminous display panel being located at a side of the optical film set far away from the light guide film;

wherein the first end is defined with a first groove and a bottom of the first groove is disposed with a first convex lens structure, the second end is defined with a second groove and a bottom of the second groove is disposed with a second convex lens structure, a convex surface of the first convex lens structure faces toward the light-emitting source, and a convex surface of the second convex lens structure faces toward the light incident surface of the light guide film.

10. The edge-lit type backlight module according to claim 8, wherein the light-emitting source is inserted in the first groove, and the light-emitting source is a LED light bar.

11. The edge-lit type backlight module according to claim 8, wherein an end of the light guide film with the light incident surface is fixed in the second groove.

12. The edge-lit type backlight module according to claim 8, wherein a thickness of the first end gradually decreases along a direction departing from the light guide film, the light guide bar further comprises an intermediate section connected between the first end and the second end, and the intermediate section substantially is rectangular.

13. The edge-lit type backlight module according to claim 12, wherein a side surface of the first end located at a side of the second surface of the light guide film is a curved surface, and a side surface of the first end located at a side of the third surface of the light guide film is a planar surface.

14. The edge-lit type backlight module according to claim 8, wherein the light-emitting source is located in a focal plane of the first convex lens structure, and the light incident surface is located in a focal plane of the second convex lens structure.

15. The display device according to claim 9, wherein the light-emitting source is inserted in the first groove, and the light-emitting source is a LED light bar.

16. The display device according to claim 9, wherein an end of the light guide film with the light incident surface is fixed in the second groove.

17. The display device according to claim 9, wherein a thickness of the first end gradually decreases along a direction departing from the light guide film, the light guide bar further comprises an intermediate section connected between the first end and the second end, and the intermediate section substantially is rectangular.

18. The display device according to claim 17, wherein a side surface of the first end located at a side of the second surface of the light guide film is a curved surface, and a side surface of the first end located at a side of the third surface of the light guide film is a planar surface.

19. The display device according to claim 9, wherein the light-emitting source is located in a focal plane of the first convex lens structure, and the light incident surface is located in a focal plane of the second convex lens structure.

* * * * *